United States Patent [19]

Jong

[11] Patent Number: 4,499,918
[45] Date of Patent: Feb. 19, 1985

[54] MIXING FAUCET

[76] Inventor: Jang T. Jong, 4th Fl./1, 47, Sec. 2, Shuang Shih Rd., Taichung, Taiwan

[21] Appl. No.: 482,134

[22] Filed: Apr. 4, 1983

[51] Int. Cl.³ .......................... F16K 5/06; F16K 19/00
[52] U.S. Cl. ...................................... 137/606; 251/315
[58] Field of Search ................ 137/606, 607; 251/309, 251/315

[56] References Cited

U.S. PATENT DOCUMENTS

| | | | |
|---|---|---|---|
| 1,469,421 | 10/1923 | Lenz | 137/606 X |
| 1,984,999 | 12/1934 | Stoddard | 137/606 X |
| 2,262,046 | 11/1941 | Pope | 137/606 X |
| 2,890,856 | 6/1959 | Clade | 251/315 X |
| 3,288,430 | 11/1966 | Priese | 251/315 |
| 3,384,341 | 5/1968 | Ripert | 251/315 |
| 3,542,337 | 11/1970 | Scaramucci | 251/315 X |
| 4,175,726 | 11/1979 | Richards | 251/315 |

FOREIGN PATENT DOCUMENTS 2241521  4/1973  Fed. Rep. of Germany ...... 251/315

*Primary Examiner*—Robert G. Nilson
*Attorney, Agent, or Firm*—Tak Ki Sung

[57] ABSTRACT

A mixing faucet, used for controlling the outflow of water from a hot water pipe and a cold water pipe by means of two globe valves. The faucet comprises a main body portion, a spigot, and two globe valves each of which is provided with a globe plug, a transmission rod, two wearing rings, a sealing ring, an adjusting collar, a fixing screw, and a faucet handle.

1 Claim, 4 Drawing Figures

MIXING FAUCET

BACKGROUND OF THE DISCLOSURE

The structure of the faucet sold on the market, no matter whether it is a faucet or a mixing faucet, uses the conventional method to control the flow of water, that is to say, a transmission rod is used to lift or drop a washer by means of which the cross-section of the pipe is controlled, such that the flow of water can be adjusted. The common drawbacks of the conventional faucet are described as follows.

1. The conventional faucet cannot be used for long periods of time without maintenance. The washer of the conventional faucet is easily damaged, so that it is often required to replace the washer in order to prevent leakage of water. In other words, the conventional faucet is uneconomical and troublesome.

2. It is inconvenient to operate the conventional faucet, since many turns are required to open or close the faucet. Besides, when the conventional faucet has been used for a long period, a large force is needed to turn on or turn off the faucet. Moreover, it takes a long time to have the faucet repaired. In short, much time and money will be wasted. In this way, the conventional faucet is unsuitable for use in the present times and should be improved.

It is, therefore, an object of the present invention to provide a mixing faucet which obviates the above-mentioned drawbacks.

The primary object of the present invention is to provide a durable, easily operated faucet, which uses globe valves to control the outflow of water from a hot water pipe and a cold water pipe. The structure of the globe valves according to the present invention not only can be used for the mixing faucet, but also for the other types of faucet.

DETAILED DESCRIPTION OF THE PREFERRED EMBODIMENT

Figure 1:
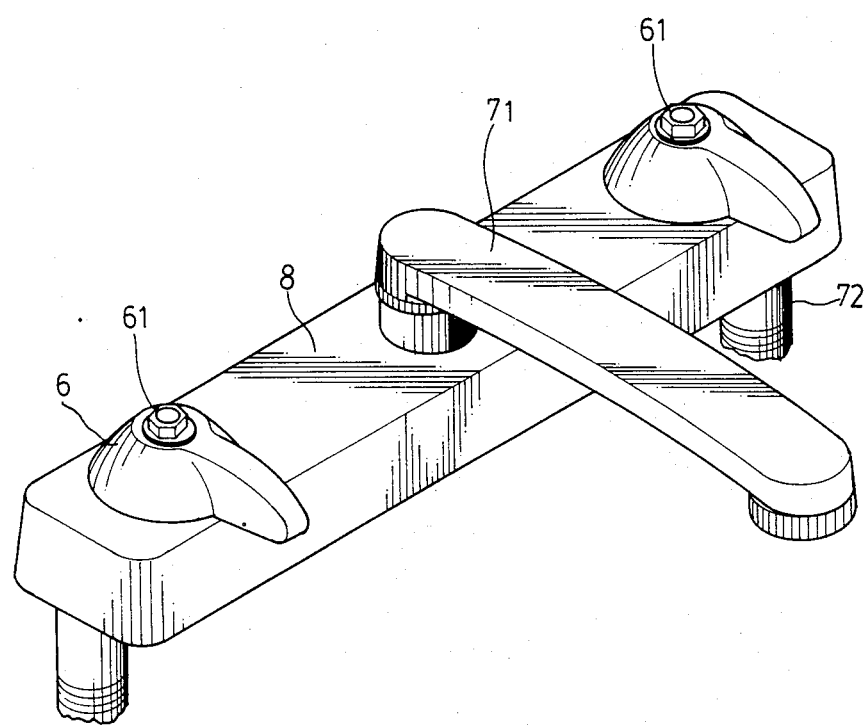
FIG. 1 is a perspective view of a preferred embodiment of the present invention.

Referring to FIG. 1, the novel mixing faucet according to the present invention comprises a main body portion (8), at the middle of which is a spigot which can be rotated 360°. Two faucet handles (6) are mounted at two sides of the main body portion (8). Two inlet pipes (72) for respectively cold and hot water are mounted at two sides of the main body portion (8). The flow-controlling structure of the present invention is divided into two control valves (100) and (101); one is used for controlling the flow of hot water, and the other one for controlling the flow of cold water. Since both control valves are identical, the description will proceed with reference to only the control valve (100).

Figure 2:
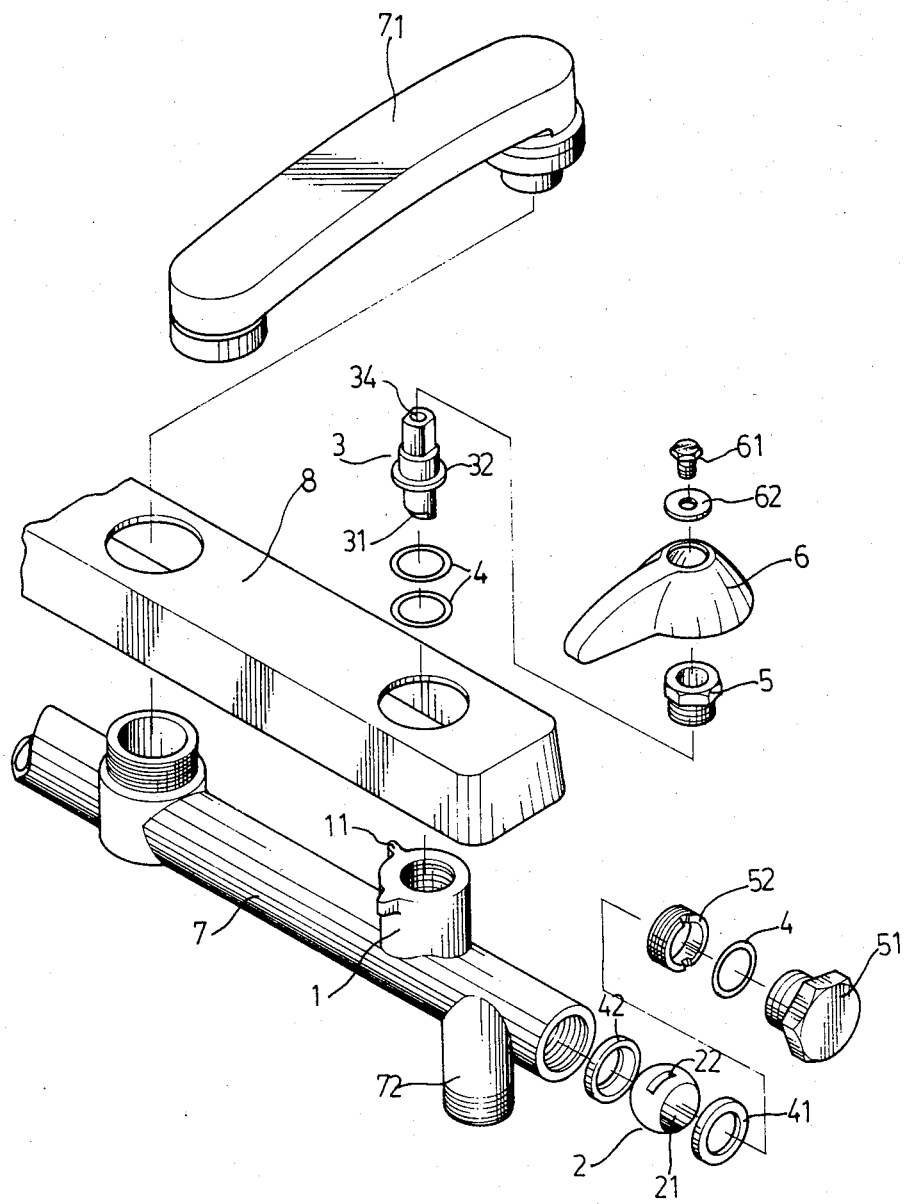
FIG. 2 is a fragmentary perspective view of the preferred embodiment of the present invention.
Figure 3:
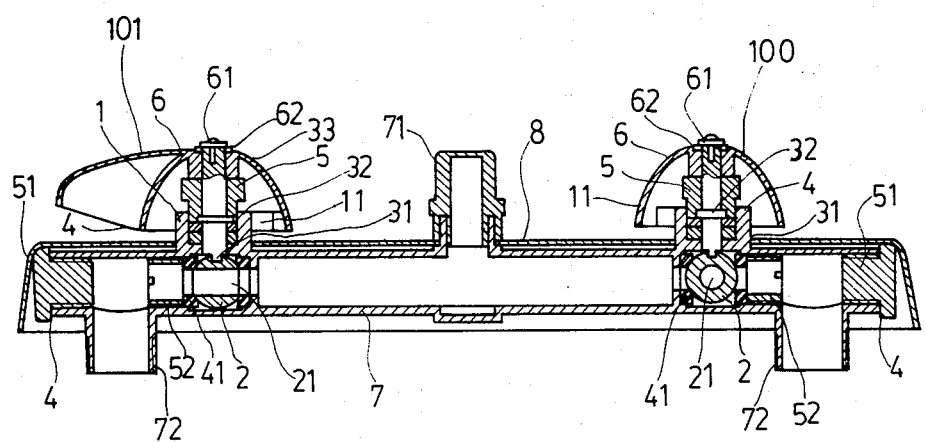
FIG. 3 is a cross-sectional view of the preferred embodiment of the present invention.

Referring to FIGS. 2 and 3, water first passes through the inlet pipe (72), and then flows out of the spigot (71). The control valve (100) mainly comprises a valve case (1). A globe plug (2), a transmission rod (3), two wearing rings (41, 42), a sealing ring (4), an adjusting collar (52), a screw sleeve (5), and a fixing screw (51). The top of the valve case (1) is provided with two protuberances (11) which make an angle of 90° and are used to limit the movement of the faucet handle (6) within 90°. The top of the valve case (1) is threaded so as to engage with the screw sleeve (5). The top of the globe plug (2) of the valve (100) is a groove (22) for engaging the transmission rod (3). The globe plug (2) is provided with a hole (21) through which water from the inlet pipe (72) may pass. The transmission rod (3), which is used for opening and closing the globe valve, is provided with a protuberance (31) used to engage the groove (22) of the globe plug (2). When the transmission rod (3) is rotated, the globe plug (2) is rotated therewith. Two sealing rings (4) are mounted under the flange (32) of the transmission rod (3), and are used to prevent the leakage of water. At the top of the transmission rod (3) is a threaded hole (34) used for engaging the faucet handle (6) by means of a screw (61) and a washer (62). At two sides of the globe plug (2) are mouned two wearing rings (41, 42). The position of the wearing ring (41) is limited by the adjusting collar (52) provided with external threads used to engage the internal threads of the water pipe (7). The adjusting collar (52) can be turned in or turned out to control the engagement between the wearing rings (41, 42) and the globe plug (2). The end of the water pipe (7) is connected to the fixing screw (51) on which is mounted the sealing ring (4) to prevent the leakage of water. The top of the valve case (1) engages the screw sleeve (5). The transmission rod (3) is inserted into the screw sleeve (5) and is engaged with the faucet handle (6).

Referring to FIG. 3, there is shown a cross-sectional view of the preferred embodiment of the present invention. The water pipe (7) the two ends of which are engaged with two fixing screws (51) is placed inside the main body portion (8). In order to seal the water pipe (7) effectively, the sealing ring (4) is placed between the fixing screw (51) and the adjusting collar (52).

As shown in FIG. 3, the hole (21) of the globe plug (2) at the right-hand side of FIG. 3 is directed to the wall of the water pipe (7), so that water from the pipe (72) cannot pass through the globe valve (100). Referring to the valve (101) on the left-hand side of FIG. 3. The hole (21) of the globe plug (2) is aligned with the water pipe (7), so that water from the inlet pipe (72) can pass through the valve (101) and is discharged from the spigot (71).

Thus, the faucet handle is required to be twisted only with an angle of 90° in order to open or close the mixing faucet completely.

Figure 4:
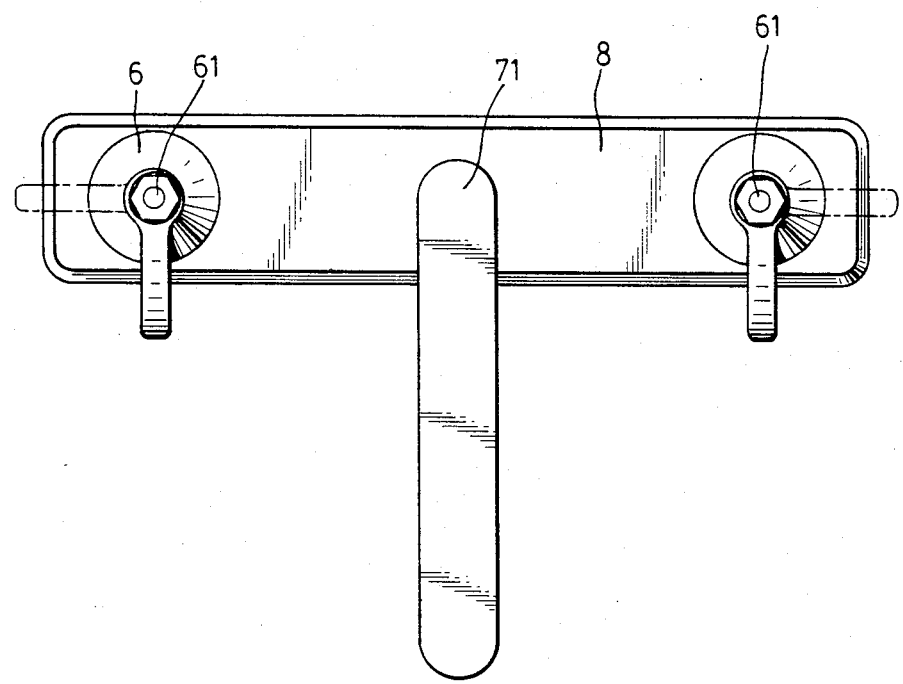
FIG. 4 shows how the turning angle of the handle is limited within 90 degrees.

Referring to FIG. 4, each faucet handle is provided with two projections (63) (not shown) which are used to define the movement of the faucet handle within 90°. Besides, the protuberances (11) of the valve case (1) and the projections (63) are encased in the faucet handle (6), thereby protecting them from being impaired.

I claim:

1. A globe mixing faucet comprising:

a water pipe;

a main body portion housing said water pipe, said main body portion being provided at the middle with a spigot communicating with said water pipe;

two globe valves provided in said water pipe, each of said globe valve comprising a valve case formed on said water pipe and communicating therewith, said valve case being formed at the top with two protuberances set apart at an angle of 90°, a globe plug disposed within said valve case, said globe plug having a groove thereon and a hole therethrough, two wearing rings disposed at two sides of said globe plug respectively, an adjusting collar threadedly engaged with said water pipe and capable of being turned in or out to adjust the engagement between said wearing rings and said globe plug, a fixing screw threadedly engaged with said water pipe, a sealing ring placed on said fixing screw for preventing leakage of water, a transmission rod located in said casing, said transmission rod being provided at the lower end with a protuberance adapted to engage said groove of said globe plug, two sealing rings surrounding said transmission rod, a screw sleeve threadedly engaged with the top of said casing, said screw sleeve having a center hole through which the upper part of said transmission rod extends, and a faucet handle threadedly engaged with the upper part of said transmission rod, said faucet handle having two projections which associate with said protuberances of said valve case to limit the movement of said faucet within 90°; and two inlet pipes mounted at two sides of said water pipe.

* * * * *